(12) United States Patent
Pohl et al.

(10) Patent No.: US 8,997,102 B2
(45) Date of Patent: Mar. 31, 2015

(54) PRIORITIZATION OF PROCESSES FOR DEACTIVATING PROCESSES TO REDUCE MEMORY PRESSURE CONDITION

(75) Inventors: William Pohl, Morgan Hill, CA (US); Walter J. Searle, Gilroy, CA (US); Chukwuma Valentine Akpuokwe, Sunnyvale, CA (US); Bradd William Szonye, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2025 days.

(21) Appl. No.: 11/144,453

(22) Filed: Jun. 3, 2005

(65) Prior Publication Data

US 2006/0277373 A1     Dec. 7, 2006

(51) Int. Cl.
  *G06F 9/46* (2006.01)
  *G06F 9/48* (2006.01)
  *G06F 9/50* (2006.01)

(52) U.S. Cl.
  CPC .............. *G06F 9/485* (2013.01); *G06F 9/4818* (2013.01); *G06F 9/5016* (2013.01)
  USPC ....................................................... 718/103

(58) Field of Classification Search
  USPC .................................................. 718/100, 103
  See application file for complete search history.

(56) References Cited

U.S. PATENT DOCUMENTS

| | | | | |
|---|---|---|---|---|
| 4,985,831 A | * | 1/1991 | Dulong et al. | 718/106 |
| 5,212,633 A | * | 5/1993 | Franzmeier | 703/23 |
| 5,748,468 A | * | 5/1998 | Notenboom et al. | 700/3 |
| 6,442,631 B1 | * | 8/2002 | Neufeld et al. | 710/107 |
| 6,910,210 B1 | * | 6/2005 | Chew | 718/103 |
| 7,137,119 B1 | * | 11/2006 | Sankaranarayan et al. | 718/103 |
| 2004/0019891 A1 | * | 1/2004 | Koenen | 718/102 |
| 2005/0240699 A1 | * | 10/2005 | Yoder et al. | 710/200 |

OTHER PUBLICATIONS

Zope Corp.; What a Change Was Needed; Feb. 15, 2005; 2 pgs.; www.zope.org/Members/htrd/cache/why; Zope Corporation, 513 Prince Edward Street, Fredericksburg, VA 22401; USA.
Slava Oks's Weblog; Memory Pressure-Classified; Feb. 28, 2005; 4 pgs.; http://weblogs.asp.net/slavao/archive/2005/02/01/364523.aspx; USA.
Zope Corp.; What Is Zope; Apr. 22, 2005; 3 pgs.; www.zope.org/WhatIsZope; Zope Corporation, 513 Prince Edward Street, Fredericksburg, VA 22401; USA.

* cited by examiner

*Primary Examiner* — Meng An
*Assistant Examiner* — James J Lee
(74) *Attorney, Agent, or Firm* — Wood Phillips

(57) ABSTRACT

It is determined that a memory pressure condition exists which limits how many active processes are allowed. There is generated and stored of a set of values corresponding to parameters for each process where the parameters are related to priority factors assigned to the associated process. There is calculated a prioritization score for each process based on the corresponding set of values. There is determined a first active process with the lowest priority based on the prioritization scores. The first active process is deactivated to reduce the memory pressure condition.

20 Claims, 3 Drawing Sheets

| | PARAMETERS | RANGE OF VALUES | DEFAULT VALUE | SYSTEM Y VALUE | SYSTEM Z VALUE |
|---|---|---|---|---|---|
| 66 | MEASURE OF RELATIONSHIP TO INIT PROCESS (e.g. NUMBER OF DESCENDENT) | 1-100 e.g. 20 = 20th DESCENDENT | 50 | 50 | 0 |
| 68 | TIME SINCE DEACTIVATION | 1-100 | 50 | 50 | 50 |
| 70 | TIME SINCE REACTIVATION | 1-100 | | | |
| 72 | TIME SINCE THREAD RAN | 1-100 | 50 | 50 | 100 |
| 74 | THREADEDNESS (EXECUTABLES) | 1-100 | 50 | 50 | 50 |
| 76 | CURRENTLY RUNNING | Y=70 N=30 | 30 | 30 | 30 |
| 78 | MEMORY USAGE | 1-100 | 50 | 50 | 50 |
| 80 | SCHEDULED PRIORITY | 1-100 | 50 | 50 | 70 |
| 82 | TEXTUAL INTERFACE | Y=40 N=60 | 40 | 60 | 100 |
| 84 | ADMIN / USER INPUT | 1-100 | 50 | 100 | 0 |
| 64 | TOTAL SCORE | 77-830 | 420 | 490 | 450 |

| PARAMETERS | RANGE OF VALUES | DEFAULT VALUE | SYSTEM Y VALUE | SYSTEM Z VALUE |
|---|---|---|---|---|
| MEASURE OF RELATIONSHIP TO INIT PROCESS (e.g. NUMBER OF DESCENDENT) | 1-100 e.g. 20 = 20th DESCENDENT | 50 | 50 | 0 |
| TIME SINCE DEACTIVATION | 1-100 | 50 | 50 | 50 |
| TIME SINCE REACTIVATION | 1-100 | 50 | 50 | 100 |
| TIME SINCE THREAD RAN | 1-100 | 50 | 50 | 50 |
| THREADEDNESS (EXECUTABLES) | 1-100 | 30 | 30 | 30 |
| CURRENTLY RUNNING | Y=70 N=30 | 50 | 50 | 50 |
| MEMORY USAGE | 1-100 | 50 | 50 | 70 |
| SCHEDULED PRIORITY | 1-100 | 40 | 60 | 100 |
| TEXTUAL INTERFACE | Y=40 N=60 | 50 | 100 | 0 |
| ADMIN / USER INPUT | 1-100 | | | |
| TOTAL SCORE | 77-830 | 420 | 490 | 450 |

FIG. 2

PRIORITIZATION OF PROCESSES FOR DEACTIVATING PROCESSES TO REDUCE MEMORY PRESSURE CONDITION

CROSS-REFERENCE TO RELATED APPLICATION

This application contains subject matter that is related to the subject matter of the following application, which is assigned to the same assignee as this application. The below-listed application is hereby incorporated herein by reference in its entirety:

"Management of Computer Processes," by W. Pohl, W. Searle and C. Akpuokwe, application Ser. No. 11/144,166, co-filed herewith.

BACKGROUND

Management of which processes remain active and which are deactivated is required when the total amount of available free memory is being approached due to increasing memory requirements. Known techniques involving the use of conventional prioritization values for each process have provided a workable but not optimal solution.

SUMMARY

The invention in one implementation encompasses a method for setting priorities for deactivating and reactivating processes in a computing system. The method comprises the steps of determining that a memory pressure condition exists which limits how many active processes are allowed; generating and storing a set of values corresponding to parameters for each process where the parameters are related to priority factors assigned to the associated process; calculating a prioritization score for each process based on the corresponding set of values; determining a first active process with the lowest priority based on the prioritization scores; and deactivating the first active process to reduce the memory pressure condition.

DESCRIPTION OF THE DRAWINGS

Features of exemplary implementations of the invention will become apparent from the description, the claims, and the accompanying drawings in which:

FIG. 2 represents tables illustrating exemplary parameters and corresponding values for determining a prioritization for deactivation/reactivation of processes.

DETAILED DESCRIPTION

Referring to the Background section above, difficulties are encountered in the current prioritization techniques for activation/deactivation of processes in view of memory pressure. Known approaches may inadvertently deactivate processes that are critical for the operation of the computing system. For example, known approaches may identify certain processes as being ineligible for deactivation such as kernel system daemons, memory locked processes and processes with real-time requirements. Other types of processes in one example should be considered critical and immune from deactivation. Processes that are descendents of defined closeness, in particular the direct children of the init process (the start up user-space process) should not be deactivated. Since these processes are configured to always be active on the system, it is a reasonable assumption that such processes are critical and that suspending such processes for a long period of time during a deactivation would result in undesired and/or unstable system behavior.

Currently known algorithms that select processes for deactivation in one example could benefit by incorporating additional information that may be available to software authors, administrators, and/or users. As will be explained in more detail below, such additional criteria provides an improvement and minimizes the likelihood of an inadvertent deactivation of a process critical to the user during times of memory pressure.

Known techniques in one example derive a prioritization score for a process in a complex manner that can be difficult to control and review. For example, a known technique may generate a prioritization score wherein some attributes add points while other attributes take away points, and the process with the most points is selected for deactivation. Such a process in one example makes it easy for a single attribute to become an undesired dominant factor of the score and of deactivation selection. Understanding why a particular process was deactivated in one example can be difficult since points are added to and subtracted from a common score without leaving an understandable record of such activity.

A plurality of criteria relevant to making a deactivation decision in one example are each assigned a range of permitted points to form a cumulative score stored in a corresponding record wherein understanding the derivation of the cumulative score can be easily discerned. This allows the system administrator to make changes and customize the selection of processes to be deactivated to better fit the system and/or user requirements.

Figure 1:
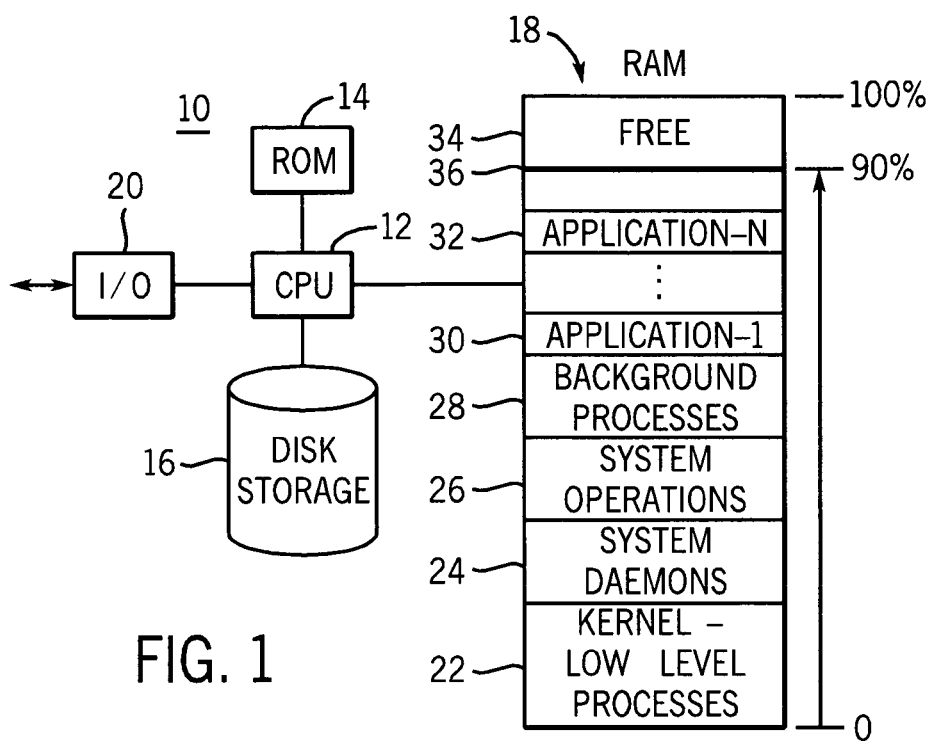
FIG. 1 is a block diagram on an exemplary apparatus.

FIG. 1 is a block diagram on an exemplary apparatus or computing system 10 suited for incorporating and executing the illustrative approaches herein. One exemplary implementation is generally directed to the management of processes running in a computing environment when free memory becomes limited. A further exemplary implementation addresses how to select processes to remain active, be deactivated and/or be reactivated during times of memory pressure.

A central processing unit (CPU) 12 is supported by read-only memory (ROM) 14, nonvolatile storage media 16 such as a disk drive, random access memory (RAM) 18 and an input/output (I/O) interface module 20. The ROM 14 and storage 16 contain stored program control instructions including the operating system environment for the CPU 12. Upon initialization (start-up) of the computing system, various portions of the operating system environment, i.e., the operating system kernel 22 of low-level processes, will be loaded into RAM 18 for access and use in the control of the CPU 12, other elements of the operating system and the management of other higher level processes. The illustrative approaches herein in one example are suited for utilization in various operating system environments; for explanatory purposes, a UNIX operating environment such as is available from Hewlett-Packard Company (3000 Hanover Street, Palo Alto, Calif. 94304-1185 USA., www.hp.com) is assumed.

The RAM 18 is depicted as an operational representation containing a plurality of processes and data. One or more active processes and/or data as will be described reside in each of the sections of RAM 18. The operating system kernel 22 consists of a plurality of low-level processes that are created during system start up (init). A plurality of system daemons 24 consists of disk and execution monitors that operate in conjunction with the kernel 22 to provide operational control for the computing system. A system operation section 26 contains processes and data of a higher level that are concerned with the overall operation of each of the components of the computing system. Background processes 28 represent a plurality of processes and services that run in the background from the user's perspective and typically operate to provide higher-level functionality, some of which maybe accessed by the user and/or higher-level programs. A first application program 30 may represent one of a plurality of programs concurrently running and typically under the operational control of the user. The last of such applications is represented as application-N 32. Above application 32 is the amount of free or unused memory 34 available within RAM 18. An exemplary memory pressure threshold level 36 is utilized to determine when memory pressure is being exerted, i.e., when a predetermined minimum amount of free memory exists in order to maintain a stable operating memory environment. In this example, the threshold level has been set to 90% of capacity, i.e., 10% of memory remains free for use. As illustrated in FIG. 1, the amount of free memory 34 is more than 10% and a memory pressure condition does not exist. When the cumulative amount of memory in use reaches or exceeds 90%, in one example a memory pressure condition will be determined to exist. Exemplary prioritization approaches will be described below for selecting which processes to deactivate in order to relieve memory pressure.

Those skilled in the art will appreciate that the depiction of RAM 18 is intended to provide a functional perspective. Actual memory usage represented by the illustrative sections in FIG. 1 can vary depending upon the operating system and computing environment. For purposes of determining the amount of free memory relative to the memory pressure threshold level 36, some portions of memory that are not being currently utilized may not be determined to be "free" for various reasons. For example, small amounts of discontinuous memory may not be sufficiently useful depending upon the operating environment and may not be considered free for purposes of computing the amount of free memory when determining the memory pressure threshold. It will also be understood that unused memory determined to be free memory in one example may not necessarily be contiguous. In a further example, the specific memory pressure threshold level is a function of the computational system design that may include the nature of the programs normally run on the system as well as any known or projected load volatility. In one example of a system cycle, active and deactivated processes can be swapped in one time interval of the continuum of time intervals during which memory pressure is evaluated. For example, during a system cycle during memory pressure where a previously deactivated process (DP) has a higher priority, as determined by the approaches explained below, than a currently active process (AC), the AC will be deactivated and the DP will be reactivated based on a comparison of the respective assigned priorities and assuming that such a swap does not exacerbate the memory pressure.

FIG. 2 contains representative tables 50 illustrating exemplary parameters and corresponding values for determining the prioritization for deactivation/reactivation of each process in a computing environment such as shown in FIG. 1. In one example, a separate table, e.g., table 52, is generated and maintained for each process. Those skilled in the art will appreciate that other techniques could be used for storing this information and that various additional or alternate parameters relevant to making a prioritization decision could be used. The information contained in the tables could be maintained and stored in any rapidly accessible memory location in the computing environment. In one example, the information is maintained in the system daemon portion 24 or the kernel 22 of RAM 18. An active process is a process currently residing and available for execution such as in RAM memory 18. A deactivated process is a process not currently residing and or available for immediate execution in RAM memory 18, e.g., the process may have been transferred to a virtual memory location such as disk storage 16.

The rows illustrate different parameters and corresponding values used to determine the deactivation/reactivation priority assigned to the process associated with the table. Column 54 contains the name or label for each parameter. Column 56 is provided for purposes of explanation to show the range of values for each parameter. Columns 58, 60 and 62 contain parameter values used to determine 3 different sets of total priority scores calculated in row 64. Each of columns 58, 60 and 62 can have different weight factors for each parameter (row) so that different prioritization objectives can be obtained as will be explained below. Generally, only one of columns 58, 60 and 62 for each table will be used to determine priorities for all the processes in the computing system. In the illustrative example, priority scores for each row can range from 1-100 where 100 represents the lowest priority, i.e., the process with the highest total score will be first to be considered for deactivation. A process with the lowest score will be the first to be reactivated if in a deactivated state or will not be deactivated if in an active state.

Row 66 in one example is a parameter intended to measure the parent-child relationship, if any, of a process to a start up (init) process such as in a UNIX based operating system. An init process itself would have a value of 0; a direct child of an original init process would have a value of 1; etc. A maximum value of 100 is used to describe the 100th descendent or other processes that are not a descendent or a more remote descendent. Original children processes of the initialization process in one example receive preferential prioritization so that these processes are maintained in active memory even during times of memory pressure. In traditional Unix a reference to a process' parent is stored in the process address space. A difficulty arises when the parent terminates. This causes the child process to be "adopted" by the init. To overcome this problem in determining direct lineage, processes that are orphaned and adopted by the init are flagged. In one example, one can determine that a process is a direct lineage of the init based on whether the subject process is a child of the init (YES) and whether the process has been adopted (NO).

Row 68 is a parameter corresponding to the time since the last deactivation of the subject process, assuming that the process is currently deactivated. Row 70 is a parameter corresponding to the time since the last reactivation of the subject process, assuming that the process is currently active. For these two times the values can range between 1-100. Typically, a process just deactivated would receive a high score in row 68 which would weigh against a soon reactivation to prevent thrashing, and a process deactivated for a substantial period of time would receive a low score in row 68 which would weigh in favor of a soon reactivation. Similarly, a process just reactivated would receive a low score in row 70 which would weigh in favor of remaining active and if it had been active for a substantial period of time receive a high score in row 70 which would weigh in favor of deactivation. Since each process will either be active or deactivated, each process will receive only one score in one of rows 68 and 70. In row 72 the time since the thread ran involving the process is given a score of 1-100 where the thread having just run that involves the process would typically result in a high score that would weigh in favor of deactivation. These time values can be values proportional to time or time increments, and represent the measurement of time, e.g., seconds.

In row 74 the threadedness of the executables involving the subject process is given a score in which a process involving a large number of executables would typically be given low score that would weigh in favor of remaining active or reactivation. In row 76 a determination is made of whether the subject process is currently running wherein YES=70 and NO=30 thereby providing a moderate weighting favoring a non-running process to be activated and a moderate weighing favoring a running process to be deactivated.

In row 78 the amount of memory used by the subject process is given a rating of 1-100 wherein a relatively large amount of memory utilized by the process will result in a relative low score thereby weighing in favor of activation. This value represents the size of memory occupied by the respective process such as measured in kilobytes or megabytes. In row 80 a scheduled priority for the running of the subject process is given a score of 1-100 wherein a process not scheduled to run for a substantial period of time would be given in a relatively high score and a process scheduled to run very soon would be given in a relatively low score. In row 82 a determination is made of whether a textual interface is present for the subject process wherein YES=40 and NO=60 thereby providing a slight weighing in favor of remaining active/reactivation if a textual interface is present. In row 84 a parameter is provided that can have a value between 1-100 that can be set by the administrator and/or user. This provides the administrator/user with an opportunity to provide an input that will directly influence the deactivation/reactivation of a subject process. Row 64 stores a calculation summing the values in the columns. In one example, a total score for the default column can range between 77-830 as illustrated by column 56. The default value column 58 contains a total score of 420 which represents a neutral or middle value that would not tend to substantially weigh in favor of deactivation or reactivation of the subject process.

In making a determination of which active processes should be deactivated and which deactivated processes should be reactivated, the total prioritization scores of the processes will be compared. Generally, the processes with the lower scores should remain active or be reactivated during times of memory pressure to the extent that the processes can be accommodated in memory without adding to memory pressure. Approaches for determining rates of deactivation/reactivation may be employed.

Separate sets of weighting factors can be associated with System Y and System Z corresponding to columns 60 and 62, respectively. Different weighting factors associated with columns 60 and 62 can be applied to each default value in each row to produce a corresponding value in the same row for columns 60 and 62. This provides the administrator and/or user with the flexibility to configure the computing system to accommodate specific applications or give preference to certain types of processes. For example, a college time-shared computing system (system Y) in one example prefers to keep processes that have a textual interface active, i.e., from being swapped out or deactivated. In a further example, batched type of processes also being run on this system would be the preferred candidate for deactivation in times of memory pressure. In another example, a computing system (system Z) that supports an Internet retailer considers a batch process of high importance (e.g., deactivation of such processes not being desired) since it would likely relate to a potential sale to a customer. The computing system supporting the Internet retailer in one example would likely give a low importance (deactivation being satisfactory) to a textual interface process which would likely be an administrative person or manager merely seeking status of system. It will be apparent to one skilled in the art that appropriate weighting factors can be applied to the normally calculated prioritization default values to influence, if not directly control, appropriate priorities for the intended use. In one example, the information associated with the prioritization tables is updated each system cycle in preparation for deactivation(s)/reactivation(s) made during each system cycle.

System Y which could represent a Web Server configuration is shown in FIG. 2 in column 60 with values that could be utilized for this application. System Z which could represent a college time share configuration is shown in FIG. 2 in column 62 with values that could be utilized for this application. A number of implementations offer flexibility and can accommodate a variety of applications and preferences. One objective of maintaining the information in FIG. 2 is to facilitate a more equitable selection of which specific processes should be active during times of memory pressure. The selection of processes to be deactivated or reactivated during extended times of memory pressure is important in maintaining a fair distribution of computing resources among the processes. For example, a process that is deactivated at the start of a period of memory pressure may appear to a user as though this process has crashed or become unstable where the memory pressure extends for a significant time, e.g., several to many seconds, and where the deactivated process is never allowed to the reactivated during the duration of the memory pressure. This may cause the user to take action such as attempting to terminate the "stalled" process even though the process remains stable. In turn, this may place an even further load on the computational resources.

An exemplary implementation provides for an improved and more equitable sharing of computational resources among competing processes during times of memory pressure. In one example, care is to be taken not to automatically assume that an active process should necessarily be considered as a candidate to be deactivated merely based on its length of time of being active. For example, this process may be critical to the continuing stable functioning of the computing environment or may represent a user initiated process having time critical requirements. In one example, it may be inappropriate to consider this process as a candidate for the deactivation. One way of protecting such a process from deactivation is to assign a high priority so that it is unlikely or impossible for it to become a candidate for deactivation. In such a case, the priority of this process can be set by a system function with knowledge of its relative importance or by a user input. Alternatively, such important processes can be indicated such as by setting a flag associated with each process, where a corresponding flag that is set indicates that the process should not be deactivated even during an interval of memory pressure.

Figure 3:
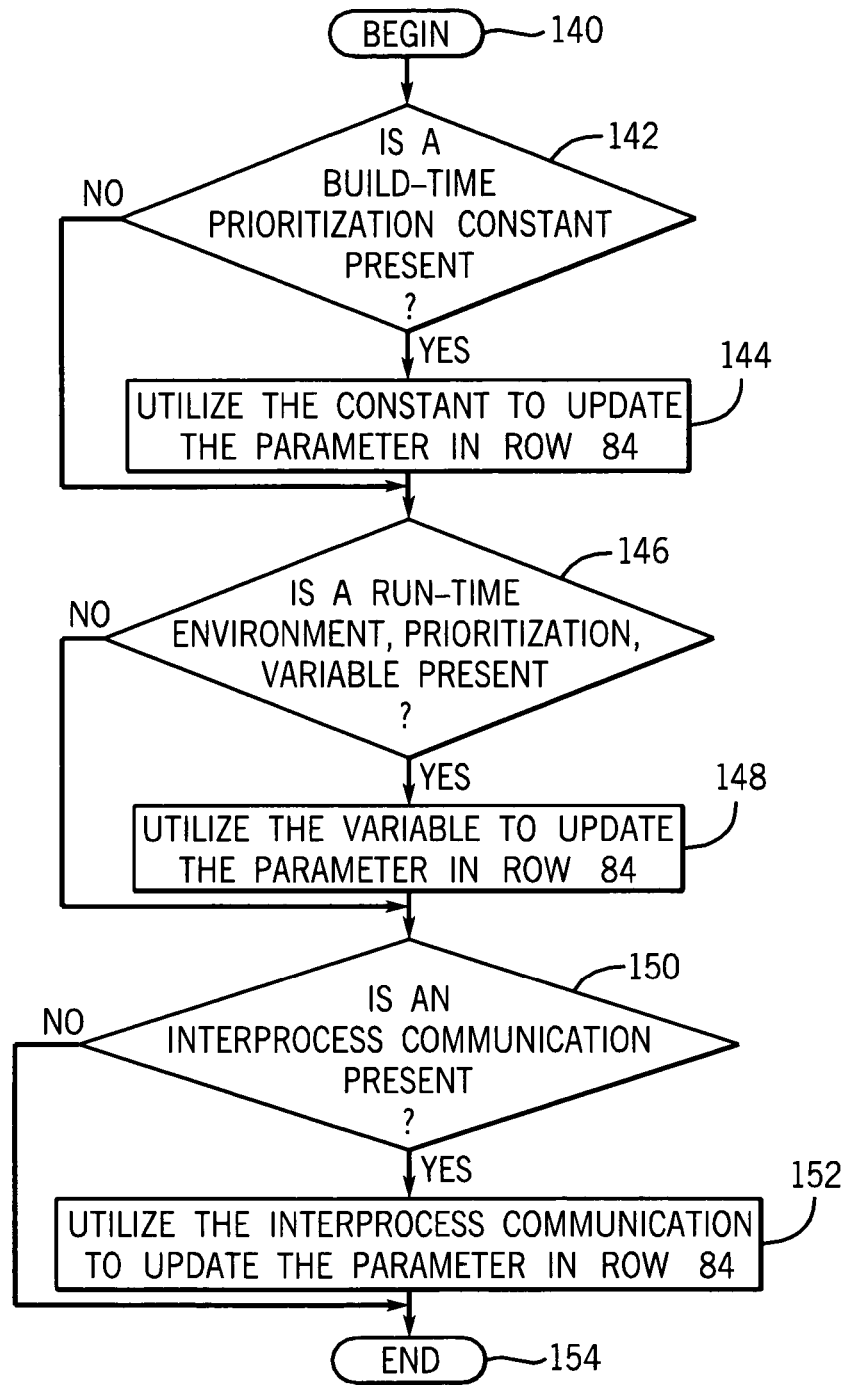
FIG. 3 is a flow diagram of an exemplary logic that permit priorities of processes to be influenced, if not controlled.

FIG. 3 is a flow diagram of exemplary logic that permits software authors, administrators, and/or users to at least influence, if not control, priorities of processes. This logic can be implemented using the exemplary computing system shown in FIG. 1. The logic starts at BEGIN step 140. In step 142 a determination is made of whether a build-time prioritization constant is present. Such a constant could be built into each program running on the computing system by using compilers, linkers or executable file editors. If desired, the actual constant could be hid from the user and presented as a build option to be selected by the user. A YES determination by step 142 results in the constant being utilized to update the administrator/user input parameter in row 84 of the prioritization table corresponding to the subject process. If such a constant is present, it will override, i.e., overwrite, the default value for the administrator/user input in row 84 of the prioritization table. A NO determination by step 142 bypasses step 144.

In step 146 a determination is made of whether a prioritization variable is present in the run-time environment. A YES determination by step 146 results in the variable being utilized to update the administrator/user input parameter in row 84 of the prioritization table in step 148. If such a variable is present, it will overwrite any previously stored value for this parameter in the prioritization table. A NO determination by step 146 bypasses step 148.

In step 150 a determination is made of whether an interprocess communication is present. This permits a communication between processes to implement a change in the administrator/user input parameter that will overwrite any previously stored values of this parameter. Although shown as a single "step" 150, in one example an interprocess communication can be made even while the subject process is running, and should be periodically monitored. For example, a UNIX operating system may provide a new signal (pseudo-signal) that would have the effect of changing the deactivation/reactivation preferences of a target process. Such control may be reserved for a privileged user or administrator. A YES determination by a step 150 results in the value associated with the interprocess communication being utilized to overwrite the administrator/user input parameter in row 84 of the prioritization table for the associated process. In NO determination by step 150 bypasses step 152. This logic terminates at END step 154.

This exemplary approach allows system and program implementers, administrators and users to take advantage of available knowledge in order to influence, if not control, the prioritization of processes. For example, consider to systems each with a database process and a graphical user interface (GUI) process. On a production system the database process is critical and should not be deactivated; but the GUI process is for diagnostic use only and therefore is not critical. The database process in one example should be given priority over the GUI process. In one example of a test and/or development system, the GUI process is critical and should not be deactivated; but the database process which may be utilized for backup recordkeeping is not critical. So, in a further example, the GUI process should be given priority over the database process. The exemplary approach in one example provides the administrator/user with the capability to adapt two identical computing systems to accommodate appropriate priorities for different applications.

Processes in a computing system in one example have priorities assigned such that the priorities determine which processes will be deactivated and/or reactivated due to memory pressure. A prioritization score in one example is determined for each process based on a plurality of parameters each with a corresponding value. These values in one example are stored in a manner so that the basis for determining prioritizations can be reviewed. Exemplary parameters include a value set by the user and a value representative of the parent-child relationship, if any, between the process and start-up processes.

Priorities in one example are set for deactivating and reactivating processes in a computing system. A determination is made that a memory pressure condition exists which limits how many active processes are allowed. A set of values corresponding to parameters for each process are generated and stored where the parameters are related to priority factors assigned to the associated process. A prioritization score in one example is calculated for each process based on the corresponding set of values. A first active process with the lowest priority in one example is determined a based on the prioritization scores. The first active process is deactivated to reduce the memory pressure condition.

Numerous alternative implementations of the present invention exist. With regard to the table of FIG. 2, management of deactivation and reactivation of processes based on prioritization of the processes in one example can be based on various factors in addition to those described. The tables of FIG. 2 in one example are updated each system cycle and deactivation/reactivation decisions in a further example are made during each system cycle. For example, depending on the type of utilization being made of the computing system, updates and decisions could be made on other and/or longer time intervals. In one example, active processes with very high priority are unlikely candidates to be deactivated and that deactivated processes with very low priority are unlikely candidates to be reactivated within the next one or few system cycles. In a further example, the priority for such processes need not be updated during each system cycle in order to conserve computational resources. It will be understood that the exemplary table of FIG. 2 is provided for purposes of explanation and a number of examples need not utilize a table. For example, the priority for each relevant process could be computed on an as needed basis with previously computed values stored at a location in a format that need not necessarily resemble a table. The values of the parameters in the table are considered "proportional" to the corresponding factor, i.e., this is intended to include being directly proportional and inversely proportional. Reference to a "user" includes people who operate or control the computing system or its programs.

With regard to FIG. 3, different steps, reordering of steps and different administrator/user inputs can be utilized to accomplish the objective of providing a more direct input into determining priorities for the deactivation/reactivation of processes especially during times of memory pressure. One or more CPUs could be utilized and the exemplary implementations described herein could be shared or run on one of the CPUs. A separate memory management module independent of the processor could be used to implement the exemplary approaches. These variations are offered merely as examples and are not intended to encompass all possible variations.

The apparatus 10 in one example comprises a plurality of components. A number of such components can be combined or divided in the apparatus 10. An exemplary component of the apparatus 10 employs and/or comprises a set and/or series of computer instructions written in or implemented with any of a number of programming languages, as will be appreciated by those skilled in the art.

The apparatus 10 in one example employs one or more computer-readable media. The computer-readable media store software, firmware and/or assembly language for performing one or more portions of one or more implementations of the invention. The computer-readable medium for the apparatus 10 in one example comprises one or more of a magnetic, electrical, optical, biological, and atomic data storage medium. For example, the computer-readable medium comprises floppy disks, magnetic tapes, CD-ROMs, DVD-ROMs, hard disk drives, and electronic memory.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. A method for setting priorities for deactivating and reactivating processes in a computing system, the method comprising the steps of:
   determining that a memory pressure condition exists which limits how many active processes are allowed;
   generating and storing a set of values for each process related to priority factors assigned to the associated process, wherein generate and storing the set of values includes generating and storing for each process at least a value that is proportional to a measure of parent-child descendent where the measure is a number of generates between the process and original start-up processes;
   calculating a prioritization score for each process based on the corresponding set of values;
   determining a first active process with lowest priority based on the prioritization scores; and
   deactivating the first active process to reduce the memory pressure condition by transferring the first active process from a random access memory that contains active processes to a virtual memory storage location.

2. The method of claim 1, wherein the generating and storing of the set of values comprises generating and storing for each process at least another value that is proportional to a length of time the process has been in its current active or deactivated state.

3. The method of claim 1, wherein the generating and storing of the set of values comprises generating and storing for each process at least another value that is proportional to an amount of memory occupied by the process.

4. The method of claim 1, wherein the step of calculating the prioritization score for each process further comprises the step of calculating further values based on applying weighting factors to said set of values, and using the further values to determine a prioritization score to be utilized.

5. The method of claim 1, wherein generating and storing of the set of values comprises generating and storing for each processor at least another value that is based on an input set by a user, the method further comprising the steps of:
   receiving more than one of said user inputs;
   determining which of the user inputs will be used to provide a basis for deriving the at least another value.

6. The method of claim 1, further comprising the steps of:
   determining a deactivated process with highest priority based on the prioritization scores;
   activating the deactivated process with the highest priority if said activating will not increase the memory pressure condition.

7. A computing apparatus, comprising:
   a processor;
   random access memory of a given size coupled to the processor adapted to store active processes;
   the processor adapted to determine that a memory pressure condition exists which limits how many active processes are allowed;
   the processor adapted to generate and causes to be stored a set of values for each process related to priority factors assigned to the associated process, wherein the processor generates and causes the storing for each process at least a value that is proportional to a measure of parent-child descendent where the measure is a number of generations between the process and original start-up processes;
   the processor adapted to calculate a prioritization score for each process based on the corresponding set of values;
   the processor adapted to identify a first active process with lowest priority based on the prioritization scores;
   the processor adapted to deactivate the first active process to reduce the memory pressure condition;
   the processor adapted to determine a deactivated process with highest priority based on the prioritization scores; and
   the processor adapted to activate the deactivated process with the highest priority if said activating will not increase the memory pressure condition.

8. The computing apparatus of claim 7, wherein the processor transfers the first active process from the random access memory that contains active processes to a virtual memory storage location.

9. The computing apparatus of claim 7, wherein the processor generates and causes the storing for each process at least another value that is proportional to a length of time the process has been in its current active or deactivated state.

10. The computing apparatus of claim 7, wherein the processor generates and causes the storing for each process at least another value that is proportional to an amount of memory occupied by the process.

11. The computing apparatus of claim 7, wherein the processor calculates further values based on applied weighting factors to said values, and uses the further values to determine a prioritization score to be utilized.

12. The computing apparatus of claim 7, wherein the processor generates and causes the storing for each process at least another value that is based on an input set by a user.

13. The computing apparatus of claim 12, further comprising:
   means for receiving more than one of said user inputs;
   the processor adapted to determine which of the user inputs will be used to provide a basis for deriving the at least another value.

14. An article, comprising:
   one or more non-transitory computer-readable media comprising:
   instructions for determining that a memory pressure condition exists which limits how many active processes are allowed;
   instructions for generating and storing a set of values for each process related to priority factors assigned to the associated process, wherein instructions for generating and storing the set of values for each process comprises instructions for generating and storing for each process at least a value that is proportional to a measure of parent-child descendent where the measure is a number of generations between the process and original start-up processes;
   instructions for calculating a prioritization score for each process based on the corresponding set of values;
   instructions for determining a first active process with lowest priority based on the scores; and
   instructions for deactivating the first active process to reduce the memory pressure condition;
   wherein the instructions for deactivating the first active process comprises instructions for transferring the first active process from a random access memory that contains active processes to a virtual memory storage location.

15. The article of claim 14, wherein the instructions for generating and storing the set of values comprises instructions for generating and storing for each process at least another value that is proportional to length of time the process has been in its current active or deactivated state.

16. The article of claim 14, wherein the instructions for the generating and storing the set of values comprises instructions for generating and storing for each process at least a value that is proportional to an amount of memory occupied by the process.

17. The article of claim 14, wherein the instructions for calculating the prioritization score for each process further comprises the instructions for calculating further values based on applying weighting the factors to said set of values, and using the further values to determine a prioritization score to be utilized.

18. The article of claim 14, wherein the instructions for generating and storing the set of values comprises instructions for generating and storing for each process at least another value that is based on an input set by a user.

19. The article of claim 18, further comprising:
instructions for receiving more than one of said user inputs;
instructions for determining which of the user inputs will be used to provide a basis for deriving the at least another value.

20. The article of claim 14, further comprising:
instructions for determining a deactivated process with the highest priority based on the prioritization scores;
instructions for activating the deactivated process with the highest priority if said activating will not increase the memory pressure condition.

* * * * *